(12) United States Patent
Wenzek et al.

(10) Patent No.: US 11,055,370 B2
(45) Date of Patent: Jul. 6, 2021

(54) METHOD FOR AUTOMATICALLY CONSTRUCTING INTER-LANGUAGE QUERIES FOR A SEARCH ENGINE

(71) Applicant: PROXEM, Paris (FR)

(72) Inventors: Guillaume Wenzek, Paris (FR); Jocelyn Coulmance, Paris (FR); Jean-Marc Marty, Paris (FR)

(73) Assignee: PROXEM, Paris (FR)

( * ) Notice: Subject to any disclaimer, the term of this patent is extended or adjusted under 35 U.S.C. 154(b) by 604 days.

(21) Appl. No.: 15/757,649

(22) PCT Filed: Sep. 6, 2016

(86) PCT No.: PCT/EP2016/070971
§ 371 (c)(1),
(2) Date: Mar. 5, 2018

(87) PCT Pub. No.: WO2017/042161
PCT Pub. Date: Mar. 16, 2017

(65) Prior Publication Data
US 2019/0026371 A1  Jan. 24, 2019

(30) Foreign Application Priority Data
Sep. 7, 2015   (FR) ..................... 1558249

(51) Int. Cl.
*G06F 16/9535*  (2019.01)
*G06F 16/33*  (2019.01)
(Continued)

(52) U.S. Cl.
CPC ........ *G06F 16/9535* (2019.01); *G06F 16/338* (2019.01); *G06F 16/3329* (2019.01);
(Continued)

(58) Field of Classification Search
CPC ............. G06F 16/3329; G06F 16/3334; G06F 16/3337; G06F 16/3347; G06F 40/30; G06F 40/45; G06F 40/58
See application file for complete search history.

(56) References Cited

U.S. PATENT DOCUMENTS 7,251,637 B1  7/2007  Caid et al.
2009/0024613 A1*  1/2009  Niu ..................... G06F 16/3338

FOREIGN PATENT DOCUMENTS

CN  104 731 771 A  6/2015
EP  1 072 982 A2  1/2001
(Continued)

OTHER PUBLICATIONS

Gauch et al., "A corpus analysis approach for automatic query expansion and its extension to multiple databases," ACM Transactions on Information Systems, Jul. 1, 1999, pp. 250-269, vol. 17, No. 3, Association for Computing Machinery, New York, USA.
(Continued)

*Primary Examiner* — Taelor Kim
(74) *Attorney, Agent, or Firm* — Im IP Law; Chai Im; C. Andrew Im

(57) ABSTRACT

A method for automatically constructing inter-language queries performed by a search engine from a text file containing a learning corpus. The learning corpus includes a set of phrases expressed in a corresponding manner in at least two languages. Each word of each of the two languages being associated with a target vector. The target vectors of the words of the learning corpus in at least two languages aligned. N words in each of the at least two languages having the closest target vectors with respect to a target vector associated with a query word are retrieved. The queries to be performed by the search engine from the N preceding words recovered in the at least two languages are established.

10 Claims, 3 Drawing Sheets

(51) Int. Cl.
*G06F 16/332* (2019.01)
*G06F 16/338* (2019.01)
*G06F 40/30* (2020.01)
*G06F 40/45* (2020.01)
*G06F 40/58* (2020.01)

(52) U.S. Cl.
CPC ...... *G06F 16/3334* (2019.01); *G06F 16/3337* (2019.01); *G06F 16/3347* (2019.01); *G06F 40/30* (2020.01); *G06F 40/45* (2020.01); *G06F 40/58* (2020.01)

(56) References Cited

FOREIGN PATENT DOCUMENTS

| | | |
|---|---|---|
| EP | 2 624 149 A2 | 8/2013 |
| WO | 2015/029241 A1 | 3/2015 |

OTHER PUBLICATIONS

Tomas Mikolov et al., "Efficient Estimation of Word Representations in Vector Space," In Proceedings of Workshop at ICLR, Jan. 16, 2013.
Audrey Laroche et al., "Revisiting Context-based Projection Methods for Term-Translation Spotting in Comparable Corpora," Proc. 23rd Intern. Conf. Computational Linguistics, Oct. 1, 2010, pp. 617-625.

\* cited by examiner

| fr | it | pt | es | en |
|---|---|---|---|---|
| innovation | innovazione | inovação | innovación | non-technological |
| innovations | innovativa | criatividade | innovaciones | entrepreneurial |
| créativité | innovazioni | inovações | innovadora | knowledge-driven |
| entrepreneurial | imprenditoriale | inovadora | creatividad | innovations |
| innovante | imprenditorialità | tecnologias | tic | information-based |
| entrepreneuriat | pmi | competitividade | tecnologías | innovating |
| compétitivité | innovativo | tic | competitividad | eco-efficiency |
| technologies | creatività | empreendedor | estimulación | research |
| entreprenariat | imprenditoria | criadora | emprendedor | policy-driven |
| innovant | tecnologie | pci | punteras | internationalisation |

| de | pl | el | fi | bg |
|---|---|---|---|---|
| innovation | innowacji | καινοτομία | kilpailukyvyn | иновациите |
| innovationen | innowacyjności | καινοτομίας | teknologian | иновации |
| unternehmergeist | innowacyjność | καινοτομίες | kilpailukykyä | иновация |
| wissensgesellschaft | innowacje | καινοτομιών | kilpailukyky | иновацията |
| innovations- | innowacjom | γνώσης | tutkimukseen | научноизследователската |
| innovationsfähigkeit | innowacyjnej | επιχειρηματικότητας | pk-yritysten | предприемаческия |
| unternehmerischer | innowacjami | καινοτόμων | työllisyyttä | иновационния |
| forschungs- | innowacyjnego | δημιουργικότητας | kasvun | иновационен |
| unternehmerisches | tworzenia | καινοτόμος | kasvua | развойната |
| wettbewerbsfähigkeit | kreatywność | καινοτόμο | työpaikkojen | знанието |

| cs | hu | nl | da |
|---|---|---|---|
| inovaci | innováció | innovatie | innovation |
| inovace | innovációnak | innovaties | innovationen |
| inovací | innovációhoz | innovatievermogen | videnbaseret |
| inovacím | innovációs | innovatiecapaciteit | nyskabelse |
| inovační | innovációt | innoverende | innovationer |
| internacionalizaci | kutatás | ondernemersklimaat | innovativ |
| znalostní | tudásba | innovatief | innovations- |
| výzkumu | innováción | innovatiepotentieel | innovationsevne |
| znalostního | kutatás-fejlesztés | kennismaatschappij | ivaerksaetterånd |
| inovacemi | újításokat | ondernemerschap | innovativt |

| et | ro | sl | sk | lt |
|---|---|---|---|---|
| innovatsiooni | inovare | inovacij | inovácie | naujovių |
| innovatsioonile | inovaţiei | inovacije | inovácií | inovacijų |
| teadmuspõhise | inovaţie | inovativnost | inovácii | naujoves |
| uuendustele | inovarea | inovativnosti | inováciám | naujovėms |
| uuendusi | inovării | inovacijam | inováciu | inovacijoms |
| innovatsioonipotentsiaali | inovaţia | inovativnostjo | výskumu | inovacijomis |
| uuendustest | cunoaşterii | inovacijske | inovácia | inovacijas |
| uuenduste | cunoaştere | ustvarjanja | inovačnej | naujovėmis |
| uuendusteks | inovări | inovacijah | znalostnej | inovacijos |
| innovatsiooniks | inovaţii | inovacijami | konkurencieschopnosť | naujovės |

| sv | lv |
|---|---|
| innovation | jauninājumiem |
| nyskapande | inovācijai |
| innovationen | inovāciju |
| innovationer | inovācijas |
| innovationsförmåga | jauninājumu |
| entreprenörsandan | inovācijās |
| kunskapsbaserad | inovācijām |
| kunskapsbaserat | jauninājumus |
| innovationerna | jaunrades |
| innovationsområdet | novatorisma |

Fig.3

| PL : train_fr | Traduction | PL : train_fr – sta_it | Traduction |
|---|---|---|---|
| obecnie | maintenant | pociąg | train |
| pociąg | train | pociągu | train |
| kiedy | quand | kolejową | train |
| pociągu | train | perony | plates-formes |
| tym | cette | torów | pistes |
| którym | où | wagonów | wagons |
| na | sur | tory | pistes |
| aktualnie | actuellement | torze | piste |
| perony | plates-formes | trasie | à partir de |
| czym | qu'est | prędkością | vitesse |

Fig.4

METHOD FOR AUTOMATICALLY CONSTRUCTING INTER-LANGUAGE QUERIES FOR A SEARCH ENGINE

RELATED APPLICATIONS

This application is a § 371 application from PCT/EP2016/070971 filed Sep. 6, 2016, which claims priority from French Patent Application No. 15 58249 filed Sep. 7, 2015, each of which is incorporated herein by reference in its entirety.

TECHNICAL FIELD OF THE INVENTION

The invention relates to the field of computer science applied to language. More specifically, the invention relates to a method for automatically constructing inter-language queries for a search engine.

BACKGROUND TECHNOLOGY

It is known to represent words by fixed-size vectors. It is a distributed representation, insofar as it is not necessary that there be a one-to-one correspondence between the vector dimensions and the linguistic properties of the words distributed according to the dimensions of the space.

A known method, so-called Skip-gram (Tomas Mikolov, Kai Chen, Greg Corrado, and Jeffrey Dean. 2013a, Efficient estimate of word representations in vector space, arXiv preprint arXiv: 1301.3781), enables a word vector learning allowing the processing of a very large amount of data in a short time. So the Skip-gram method enables to process a set of 1.6 billion words in less than a day.

In the state of the art, the queries constructed with the search engines from word vectors can be carried out in one language only.

OBJECT OF THE INVENTION

The invention aims to make it possible to construct, from a query word, queries executable by a search engine in multiple languages. For that purpose, the invention proposes a method for automatically constructing inter-language queries executed by a search engine, characterized in that, from a text file containing a learning corpus comprising all the sentences correspondingly expressed in at least two languages, the words of each of the two languages being each associated with a target vector, said method comprises:
  a step of aligning target vectors of the words of said learning corpus in said at least two languages,
  a step of recovering N words from each of the at least two languages comprising some closest target vectors to a target vector associated with a query word, and
  a step of constructing queries executed by a search engine from N words previously recovered from said at least two languages.

According to one embodiment, in order to allow a user to filter a meaning of said query word among several meanings, said method further comprises:
  i) a step of determining M closest target vectors to said target vector associated with said query word,
  ii) a step of selecting the closest target vector corresponding to the meaning of said query word to be filtered, and
  iii) a step of subtracting said selected nearest target vector from the target vector associated with said query word.

According to one embodiment, the above-mentioned steps i) to iii) are repeated until some results returned by said search engine are free from the meaning of the query word to be filtered.

According to one embodiment, the step of subtracting is carried out by application of the Gram-Schmidt orthonormalization method.

According to one embodiment, as each word of said learning corpus is associated with a target vector and a context vector, the step of aligning target vectors comprises:
  steps of calculating cost functions, so-called intra-language functions, in order to calculate target vectors and context vectors in each of the two languages,
  steps of calculating cost functions, so-called inter-language cost functions, respectively in order to align the target vectors of the words in a first language with the context vectors of the words in a second language as well as to align the target vectors of the words in the second language with the context vectors of the words in the first language, and
  a step of minimizing the sum of the at least four previously calculated cost functions.

According to one embodiment, the step of calculating each inter-language cost function is carried out by an iterative method implementing a sliding window in said learning corpus and based on the analysis of a target vector of a word of interest in the window with respect to the context vectors of the other words in the window, so-called context words, located around the word of interest and expressed in the same language as the word of interest.

According to one implementation, the intra-language cost function implemented in the Skip-Gram method is expressed as follows:

$$J = \sum_{s \in C} \sum_{w \in s} \sum_{c \in s[w-l:w+l]} -\log \sigma(\vec{w} \cdot \vec{c})$$

C corresponding to all the sentences of said learning corpus in a given language;
s[w−l:w+l] being the word window corresponding to a sentence of the learning corpus centered to the word of interest w,
w being the word of interest of the sentence,
c being a context word,
$\vec{w}$ being the target vector of the word of interest,
$\vec{c}$ corresponding to the context vector of the context word.
σ being a Sigmoid type function.

According to one embodiment, the steps of calculating the inter-language cost functions of one language with respect to another language are carried out by an iterative method implementing a sliding window in the learning corpus and based on the analysis of a target vector of a word of interest in the window with respect to the context vectors of all the words in the window, including the word of interest expressed in one language different from the language of the word of interest.

According to one embodiment, the inter-language cost function is expressed in the following way:

$$\Omega_{e,f} = \sum_{(s_e, s_f) \in A_{e,f}} \sum_{w_e \in s_e} \sum_{c_f \in s_f} -\log \sigma(\vec{w}_e \cdot \vec{c}_f)$$

$s_e$ being a sentence expressed in the first language e and corresponding to the translation of a sentence $s_f$ in the second language f, $A_{e,f}$ being the aligned corpus of the sentences expressed in the first language and in the second language, $w_e$ being a target word selected in the sentence "$s_e$" corresponding to the window centered to the word of interest $w_e$ and defined by $s_e[w_e-1:w_e+1]$, the context selected for a word of interest $w_e$ in the sentence "$s_e$" being constituted by all the words $c_f$ appearing in the sentence $s_f$, including the word of interest $w_e$, $\vec{w}_e$ being the target vector of the word of interest, $\vec{c}_f$ corresponding to the vector of the context words in the language other than the language of the word of interest, σ being a Sigmoid type function.

According to one embodiment, in order to align target vectors of words in an additional language, said method further comprises:

a step of calculating an intra-language cost function in order to determine the target vectors and context vectors in the additional language, a step of calculating an inter-language cost function in order to align the target vectors of the words in the additional language with respect to the target vectors of the words in one of the languages, so-called pivot language, as well as to align the target vectors of the words in the pivot language with respect to the target vectors of the words in the additional language, and a step of minimizing the sum of all the costs functions also integrating the intra-language cost function and the inter-language cost function previously calculated for the additional language.

The invention also relates to computer type equipment such as a computer or server comprising a memory for storing software instructions enabling the implementation of the method as previously defined.

BRIEF DESCRIPTION OF THE FIGURES

The invention will be better understood on reading the following description and examining the annexed figures. These figures must be considered as an illustration only and by no means as a limitation of the invention.

FIG. 3 is a table illustrating the query words that can be generated, thanks to the method according to the present invention, in 21 languages from a target vector associated with a single query word;

FIG. 4 is a table illustrating the possibility of disambiguating a query word having multiple meanings by subtracting a target vector associated with a word in another language corresponding to the meaning to be filtered.

DESCRIPTION OF EXEMPLARY
EMBODIMENTS OF THE INVENTION

The method according to the present invention is implemented from a text file containing a learning corpus C comprising all the sentences correspondingly expressed in at least two languages, for example the English language "e" and the French language "f". The words in each of the two languages are each associated with a target vector $\vec{w}$ and a context vector $\vec{c}$. The target vector $\vec{w}$ and context vector $\vec{c}$ each comprises a number of components comprised between 50 and 1000 and, for example, 300.

Figure 1:
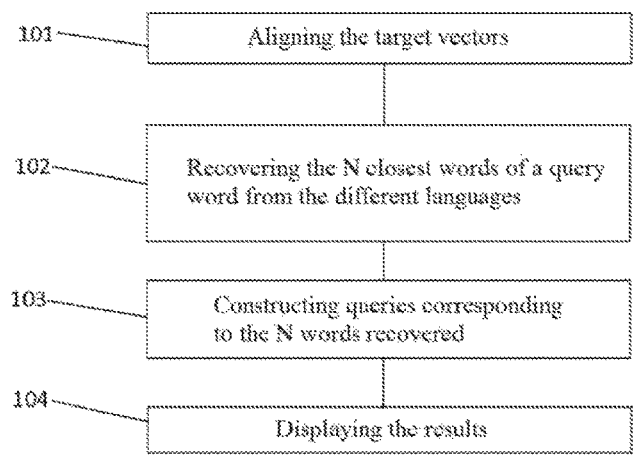
FIG. 1 shows a diagram of the different steps of the method for automatically constructing inter-language queries according to the present invention.

As illustrated in FIG. 1, the method comprises at first a step 100 of determining aligned target vectors $\vec{w}$ of the words in the two languages, such that two target vectors $\vec{w}$ associated with two corresponding words in the two languages are the closest to one another. In other words, once the step 100 of aligning the targeted vectors $\vec{w}$ is carried out, for a target vector $\vec{w}$ associated with a word in a given first language, there is no other target vector $\vec{w}$ closer to the word associated with the translation of the word into the other language.

Figure 2:
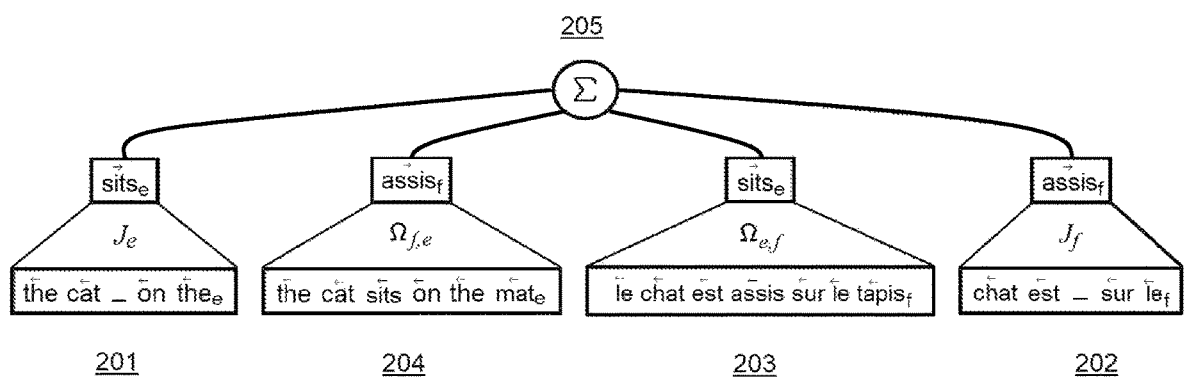
FIG. 2 shows a diagram of the steps implemented to determine aligned target vectors of words in two different languages.

For this purpose, as illustrated by the diagram in FIG. 2, steps 201, 202 of calculating cost functions $J_e$, $J_f$, so-called intra-language cost functions, are carried out in order to calculate the target vectors $\vec{w}$ and the context vectors $\vec{c}$ in each of the two languages. In the example, an intra-language cost function $J_e$ is calculated for the English language and an intra-language cost function $J_f$ is calculated for the French language.

Preferably, the steps 201, 202 of calculating each intra-language cost function $J_e$, $J_f$ are carried out by an iterative method implementing a sliding window in the learning corpus C and based on the analysis of a target vector $\vec{w}$ of a word of interest in the window with respect to the context vectors $\vec{c}$ of the other words in the window, so-called context words, situated around the word of interest and expressed in the same language as the word of interest. The word of interest is not taken into account when calculating the target vectors of the context words.

Specifically, the intra-language cost function J implemented in the Skip-Gram method is expressed for each language as follows:

$$J = \sum_{s \in C} \sum_{w \in s} \sum_{c \in s[w-1:w+1]} -\log\sigma(\vec{w} \cdot \vec{c})$$

C corresponding to all the sentences of said learning corpus in a given language;

s[w−1:w+1] being the word window corresponding to a sentence of the learning corpus centered to the word of interest w, w being the word of interest of the sentence, c being a context word, $\vec{w}$ being the target vector of the word of interest, $\vec{c}$ corresponding to the context vector of the context word.

σ being a Sigmoid type function.

In addition, steps 203, 204 of calculating cost functions $\Omega_{e,f}$, $\Omega_{f,e}$ are carried out, so-called inter-language cost functions, respectively in order to align the target vectors $\vec{w}_e$ of the words in the first language e with respect to the context vectors $\vec{c}_f$ of the words in the second language f, as well as to align the target vectors $\vec{w}_{f,e}$ of the words in the second language f with respect to the context vectors $\vec{c}_e$ of the words in the first language e.

Preferably, the steps 203, 204 of calculating each inter-language cost function $\Omega_{e,f}$, $\Omega_{f,e}$ of one language with respect to another is carried out by an iterative method implementing a sliding window in the learning corpus C and based on the analysis of a target vector $\vec{w}$ of a word of interest in the window with respect to the context vectors $\vec{c}$ of all the words situated in the window and expressed in the language different from the language of the word of interest.

Specifically, the inter-language cost function $\Omega$ is expressed as follows:

$$\Omega_{e,f} = \sum_{(s_e,s_f) \in A_{e,f}} \sum_{w_e \in s_c} \sum_{c_f \in s_f} -\log\sigma(\vec{w_e} \cdot \vec{c_f})$$

$s_e$ being a sentence expressed in the first language e and corresponding to the translation of a sentence $s_f$ in the second language f, $A_{e,f}$ being the aligned corpus of the sentences expressed in the first language and in the second language, $w_e$ being a target word selected in the sentence "$s_e$" corresponding to the window centered to the word of interest $w_e$ and defined by $s_e[w_e-1:w_e+1]$, the context selected for a word of interest $w_e$ in the sentence "$s_e$" being constituted by all the words $c_f$ appearing in the sentence $s_f$, including the word of interest $w_e$, $\vec{w_e}$ being the target vector of the word of interest, $\vec{c_f}$ corresponding to the vector of the context words in the language other than the language of the word of interest, $\sigma$ being a Sigmoid type function.

The sum of these four cost functions $J_e$, $J_f$, $\Omega_{e,f}$, $\Omega_{f,e}$ previously calculated (see functional block 205) is minimized in order to obtain the aligned targets vectors $\vec{w_e}$, $\vec{w_f}$ in both languages.

It should be noted that it is very simple to adapt the method according to the invention in order to align target vectors $\vec{w_l}$ in an additional language. The only thing to do indeed is calculate the intra-language cost function in order to calculate the target vectors $\vec{w_l}$ and the context vectors $\vec{c_i}$ in the additional language, as well as the inter-language cost functions in order to align the target vectors $\vec{w_l}$ of the words in the additional language with respect to the target vectors $\vec{w_e}$ of the words in one of the language, so-called pivot language, as well to align the target vectors $\vec{w_e}$ of the words in the pivot language with respect to the target vectors $\vec{w_l}$ of the words in the additional language.

So, if we want to align the word vectors expressed in the Italian language "i" and if English "e" is defined as a pivot language, the intra-language cost function $J_i$ and the inter-language costs functions $\Omega_{i,e}$ and $\Omega_{e,i}$ are calculated in addition to the above-mentioned cost functions.

We then minimize the sum of all the cost functions integrating, in addition to the above-mentioned cost functions $J_e$, $J_f$, $\Omega_{e,f}$ and $\Omega_{f,e}$, the cost functions $J_i$, $\Omega_{i,e}$ and $\Omega_{e,i}$ calculated for the additional language.

Thus, by taking into account the cost functions for each additional language, the invention can easily enable the alignment of the target vectors $\vec{w_l}$ in more than 15 different languages.

Once the target vectors $\vec{w}$ are aligned according to the method previously described, it is possible to automatically construct inter-queries language for a search engine.

For this purpose, in a step 102, N words are recovered from each of the languages considered having some closest target vectors $\vec{w}$ to a target vector $\vec{w}$ associated with a query word. The determination of the closest target vectors $\vec{w}$ to one another is carried out by minimization of the Euclidean distance between the vectors.

In a step 103, the queries are then constructed and executed by a search engine from the N words previously recovered from the languages considered. The method also implements a step 104 of displaying the results returned by the search engine.

FIG. 3 thus highlights that, from a single query word, here the word "innovation", it is possible to search with 10 words per language having the closest vectors to the vector associated with the word "innovation", i.e. a search based on 210 search words in case of using 21 languages.

The invention thus makes it possible to obtain search results relating to the global meaning of a word considered in a plurality of languages, and that without necessarily having knowledge of the different languages because of the use of the aligned target vectors $\vec{w}$ in the different languages.

In addition, to allow a user to filter a meaning of a query word having several meanings, the method may also comprise:

i) a step of determining M closest target vectors $\vec{w}$ to the target vector associated with said query word, ii) a step of selecting the closest target vector $\vec{w}$ corresponding to the meaning of said query word to be filtered, and iii) a step of subtracting the closest target vector $\vec{w}$ selected to the target vector associated with the query word. This step of subtracting is preferably carried out by applying the Gram-Schmidt ortho-normalization method.

FIG. 4 thus shows the list of Polish words having the closest target vectors to the French word "train" with their translation into English. This list includes notions of vehicle, as well as notions of time (e.g. "en train de manger", i.e. being eating). The table highlights that, if the target vector of the Italian word "sta" associated only with the notion of time is subtracted from the target vector of the French word "train", we obtain a list of Polish words containing only words related to the notion of vehicle. In other words, the subtraction between target vectors in different languages can eliminate one or more meanings of a query word that the user wants to filter during her/his search in order to disambiguate a term.

The above-mentioned steps i) to iii) may be repeated by the user or in an automatic way until results displayed by the search engine are free from the meaning of the query word to be filtered.

The invention is also related to computer type equipment such as a computer or server having a memory for storing software instructions enabling the implementation of the method as previously described.

The person skilled in the art will of course be able to make changes to the above-described method without departing from the scope of the invention defined hereinafter in the claims.

The invention claimed is:

1. A method for automatically constructing inter-language queries executed by a search engine from a text file containing a learning corpus (C) comprising all sentences correspondingly expressed in at least two languages, words of each of said two languages being each associated with a target vector ($\vec{w}$), the method comprising steps of:

aligning target vectors ($\vec{w_e}$, $\vec{w_f}$) of words of said learning corpus (C) in said at least two languages;

recovering N words from each of said at least two languages having closest target vectors ($\vec{w}$) to a target vector associated with a query word;

constructing queries from the N words previously recovered from said at least two languages;

executing queries by the search engine;

displaying results returned by the search engine; and filtering a meaning of said query word among several meanings by:

determining M closest target vectors ($\vec{w}$) to the target vector associated with said query word;

selecting a closest target vector ($\vec{w}$) corresponding to the meaning of said query word to be filtered;

subtracting the closest target vector selected to the target vector associated with said query word;

wherein each word of said learning corpus (C) being associated with a target vector ($\vec{w}$) and a context vector ($\vec{c}$); and wherein the step of aligning the target vectors ($\vec{w_e}$, $\vec{w_f}$) comprises steps of:

calculating intra-language cost functions ($J_e$; $J_f$) to calculate the target vectors ($\vec{w}$) and the context vector ($\vec{c}$) in each of said two languages;

calculating inter-language cost functions ($\Omega_{e,f}$, $\Omega_{f,e}$) respectively to align targets vectors ($\vec{w_e}$) of words in a first language (e) with respect to the context vectors $\vec{c_f}$ of words in a second language (f), and to align target vectors ($\vec{w_f}$) of the words in the second language (f) with respect to the context vectors $\vec{c_e}$ of the words in the first language (e), and minimizing a sum of at least four cost functions ($J_e$; $J_f$; $\Omega_{e,f}$; $\Omega_{f,e}$) previously calculated.

2. The method according to claim 1, wherein the steps of determining, selecting and subtracting are repeated until the results returned by said search engine are free from the meaning of said query word to be filtered.

3. The method according to claim 1, wherein the step of subtracting is performed by applying Gram-Schmidt orthonormalization method.

4. The method according to claim 1, wherein the step of calculating each intra-language cost function ($J_e$, $J_f$) is performed by an iterative method implementing a sliding window in said learning corpus (C) and based on the analysis of a target vector ($\vec{w}$) of a word of interest in the sliding window with respect to the context vectors ($\vec{c}$) of context words in the sliding window situated around the word of interest and expressed in a same language as a language of the word of interest.

5. The method according to claim 4, wherein the intralanguage cost function J is expressed as follows:

$$J = \sum_{s \in C} \sum_{w \in s} \sum_{c \in s[w-l:w+l]} -\log\sigma(\vec{w} \cdot \vec{c})$$

C corresponding to all sentences of said learning corpus in a given language, s[w−l:w+l] being a word window corresponding to a sentence of said learning corpus centered to the word of interest w, w being the word of interest of the sentence, c being a context word, $\vec{w}$ being the target vector of the word of interest, $\vec{c}$ corresponding to the context vector of the context word, and σ being a Sigmoid type function.

6. The method according to claim 1, wherein the step of calculating the inter-languages cost functions ($\Omega_{e,f}$, $\Omega_{f,e}$) in one language with respect to another language is performed by an iterative method implementing a sliding window in said learning corpus (C) and based on an analysis of a target vector ($\vec{w}$) of a word of interest in the sliding window with respect to the context vectors ($\vec{c}$) of all words in the sliding window, including the word of interest, expressed in a language different from the language of the word of interest.

7. The method according to claim 6, wherein the inter-language cost function $\Omega_{e,f}$ is expressed as follows:

$$\Omega_{e,f} = \sum_{(s_e, s_f) \in A_{e,f}} \sum_{w_e \in s_e} \sum_{c_f \in s_f} -\log\sigma(\vec{w_e} \cdot \vec{c_f})$$

$s_e$ being a sentence expressed in the first language e and corresponding to the translation of a sentence $s_f$ in the second language (f), $A_{e,f}$ being the aligned corpus of the sentences expressed in the first language and in the second language, $w_e$ being a target word selected in the sentence "$s_e$" corresponding to the sliding window centered to the word of interest $w_e$ and defined by $s_e[w_e-1:w_e+1]$, the context selected for a word of interest $w_e$ in the sentence $s_e$ being constituted by all words $c_f$ appearing in the sentence sf, including the word of interest, $\vec{w_e}$ being the target vector of the word of interest, $\vec{c_f}$ corresponding to the vector of the context words in a language other than a language of the word of interest, and σ being a Sigmoid type function.

8. The method according to claim 1, further comprising, in order to align target vectors ($\vec{w_l}$) of the words in an additional language, steps of:

calculating an intra-language cost function to determine target vectors ($\vec{w_l}$) and context vectors (Ce) in the additional language;

calculating an inter-language cost function to align the target vectors ($\vec{w_l}$) of the words in the additional language with respect to target vectors ($\vec{w_e}$) of words in an pivot language, and to align the target vectors ($\vec{w_e}$)

of the words in the pivot language with respect to the target vectors ($\vec{w}_l$) of the words in the additional language; and minimizing sum of all the cost functions, including the intra-language cost function and inter-language cost function previously calculated for the additional language.

9. A computer type equipment comprising a processor and a memory to store computer executable instructions, the computer executable instructions configure the processor to perform the steps of the method according claim 1.

10. The computer type equipment of claim 9 is a processor-based computer or a processor-based server.

* * * * *